G. W. ROGERS.
Check-Row Attachment for Seed-Planter.

No. 205,810. Patented July 9, 1878.

WITNESSES:
Francis McArdle
C. Sedgwick

INVENTOR:
G. W. Rogers
BY Munn & Co.
ATTORNEYS.

UNITED STATES PATENT OFFICE.

GEORGE W. ROGERS, OF FRANKFORD, MISSOURI.

IMPROVEMENT IN CHECK-ROW ATTACHMENTS FOR SEED-PLANTERS.

Specification forming part of Letters Patent No. 205,810, dated July 9, 1878; application filed March 14, 1878.

*To all whom it may concern:*

Figure 1:
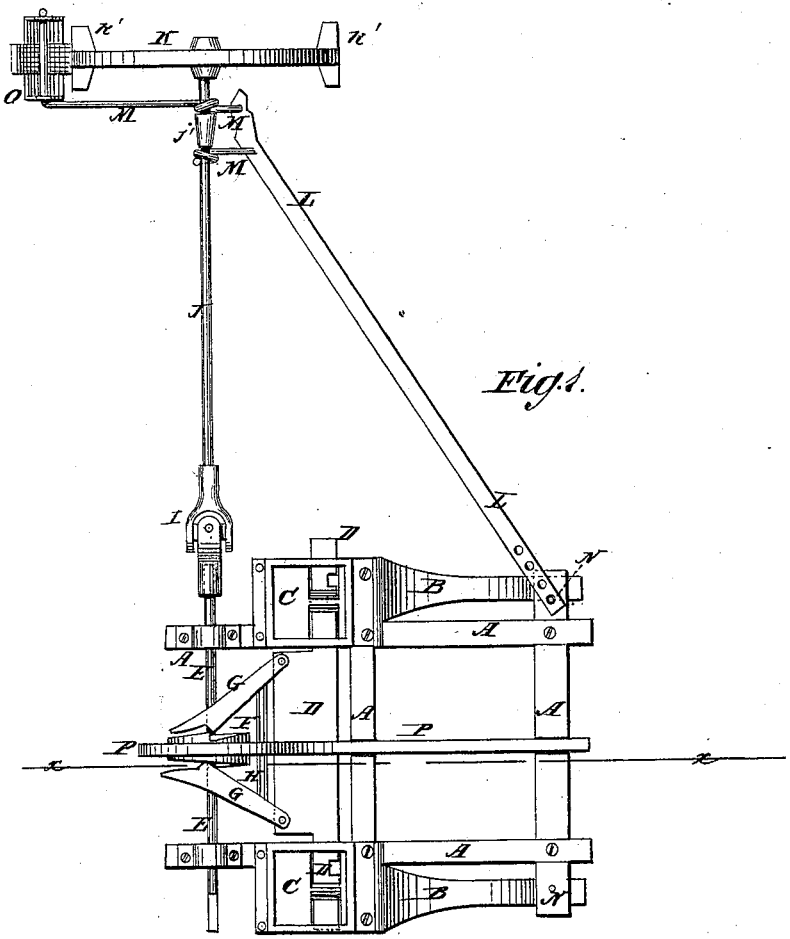
Figure 2:
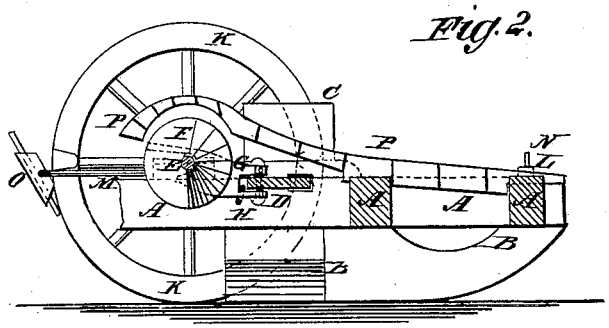

Be it known that I, GEORGE W. ROGERS, of Frankford, in the county of Pike and State of Missouri, have invented a new and useful Improvement in Check-Row Attachment for Seed-Planters, of which the following is a specification:

Figure 1 is a top view of the forward frame of a planter to which my improvement has been applied. Fig. 2 is a vertical longitudinal section of the same, taken through the line $x\,x$, Fig. 1.

Similar letters of reference indicate corresponding parts.

The object of the invention is to provide a more convenient means of operating the dropper-slide, and at the same time checking off the ground for succeeding rows of corn.

A represents the forward frame of a seed-planter. B are the cutters that open channels to receive the seed. C are the seed-hoppers, and D is the dropping-slide, about the construction of which parts there is nothing new.

To the side bars of the frame A, a little in the rear of the seed-hoppers C, are attached bearings, in which revolve the journals of a shaft, E. To the center of the shaft E is attached a wheel, F, upon the diametrically-opposite parts of the opposite sides of which are formed cams.

To the dropping-slide D are pivoted the forward ends of two bars, G, the rear ends of which have forks that straddle shaft E to keep it laterally in line, and bevels that rest against the opposite sides of the cam-wheel F, and have inclined shoulders, which are caught by the cam-shoulders on wheel F, so as alternately to push the slide D in opposite directions.

The bars G are connected, at a little distance from their forward ends, by a cord, chain, or bar, H, to hold their rear ends against the sides of the cam-wheel F, so that the dropping-slide D may be moved in opposite directions alternately to drop the seed by the revolution of the cam-wheel F.

The ends of the shaft E are squared to fit into square holes or sockets formed in the inner part of the universal joint I, which is secured in place by a pin or other conveniently-detachable means. To the other part of the universal joint I is attached the end of a shaft, J, to the other end of which is attached a wheel, K. The shaft J is made of such a length that the wheel K may roll along midway between the lines upon which the next two rows are to be planted, so that is track may be in line with the center of the machine when planting the said next two rows, and may thus be a sufficient guide to the driver. The wheel K should be of such a size as to measure off the space of two rows at each revolution.

To the rim of the wheel K, and at the distance of a semi-circumference from each other, are attached two cross-heads or marking-blocks, $k'$, to mark the ground opposite each hill, and thus enable the field to be planted in accurate check-row.

L is a bar, one end of which is connected with the shaft J at the inner side of the wheel K by two wires or rods, M, which have eyes formed in them to receive and ride upon the shaft J, and are kept in position upon the said shaft by a collar, $j'$, formed upon or attached to it. In the other end of the bar L are formed a number of holes, to receive one or the other of the pins N attached to the forward corners of the frame A. One of the rods M is extended, is bent outward to cross the rim of the wheel K, and has a scraper, O, attached to or hung upon it, to scrape off any mud that may adhere to said wheel. The scraper O is made double, so that it will operate properly upon the rim of the wheel K upon whichever side of the machine the said wheel K be placed.

With this construction, at the end of each row the universal joint I and the bar L are detached, and the wheel K and its attachments are arranged upon the other side of the machine.

To the center of the cross-bars of the frame A is rigidly attached a bar, P, the rear part of which projects over the cam-wheel F, and has a semicircular notch formed in its lower edge to receive the upper part of the said cam-wheel. The part of the bar P in front of the cam-wheel F has division-marks formed upon it, indicating fractions of the space between two hills, and the part of the said bar P over the cam-wheel F has division-marks formed upon it, indicating proportional fractions of the circumference of the said cam-wheel F.

With this construction, when the machine is turned at the end of the rows, the marking-wheel K and its attachments are changed to the other side of the machine and adjusted with the line of the marking-blocks at right angles with the line of the cam-shoulders, and the machine is driven forward until one or another of the marks upon the bar P is over a mark made by one of the marking-blocks k', and the cam-wheel F is then adjusted to bring the shoulders of its cams in line with the corresponding mark upon the rear part of the said bar; then as the machine moves forward the hills will be planted in line with the cross-rows previously planted. When the machine is stopped with the rear mark of the forward part of the bar P, or the one in front of said rear mark over the mark made by the marking-block k', the cam-wheel F is turned to bring the shoulders of the said cam-wheel in line with the forward mark on the rear part of the bar P or the one next it; or when the machine is stopped with the front mark on the forward end of the bar P over the mark made by a marking-block, k', the cam-wheel F is turned to bring the shoulders of the cams in line with the rear mark upon the rear part of the said bar P.

This construction enables the plowman to adjust the planting device, whatever part of the machine be over the mark when the horses stop, and thus avoids the annoyance of trying to stop the horses with a particular part of the machine over the mark.

Having thus described my invention, I claim as new and desire to secure by Letters Patent—

1. The combination of bars G, pivoted to dropping-slide D and connected together by a cord or bar, H, the shaft E, and cam-wheel F, all constructed and arranged to operate as described.

2. The combination of the rods M, the collar j', the scraper O, the bar L, and the pins N with the shaft J, the marking-wheel K, and the frame A of a seed-planter, substantially as herein shown and described.

GEORGE W. ROGERS.

Witnesses:
J. N. OWENS,
G. W. FORD.